US012691957B2

(12) United States Patent

Moradnia

(10) Patent No.: US 12,691,957 B2

(45) Date of Patent: *Jul. 28, 2026

(54) DEPLOYABLE AERODYNAMIC ELEMENT FOR A VEHICLE

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 449 days.

This patent is subject to a terminal disclaimer.

(21) Appl. No.: 18/333,720

(22) Filed: Jun. 13, 2023

(65) Prior Publication Data

US 2024/0417006 A1 Dec. 19, 2024

(51) Int. Cl.
B62D 35/00 (2006.01)
B62D 37/02 (2006.01)

(52) U.S. Cl.
CPC ........... B62D 35/007 (2013.01); B62D 37/02 (2013.01); *B62D 35/005* (2013.01)

(58) Field of Classification Search
CPC .... B62D 35/00; B62D 35/005; B62D 35/007; B62D 35/02
USPC ................................ 296/180.1, 180.2, 180.3
See application file for complete search history.

(56) References Cited

U.S. PATENT DOCUMENTS

| | | | |
|---|---|---|---|
| 4,257,640 A | 3/1981 | Wiley | |
| 7,086,684 B2 | 8/2006 | Glaser et al. | |
| 7,354,096 B2 | 4/2008 | Hacker | |
| 7,845,708 B2 | 12/2010 | Breidenbach | |
| 7,857,376 B2 | 12/2010 | Breidenbach | |
| 8,308,217 B2 | 11/2012 | Patel et al. | |
| 9,545,961 B2 | 1/2017 | Breidenbach | |
| 10,427,727 B2 | 10/2019 | Polidori et al. | |
| 2016/0052378 A1* | 2/2016 | Konishi ..................... B60J 7/22 | |
| | | | 296/180.1 |
| 2016/0137235 A1* | 5/2016 | Breidenbach ........ B62D 35/004 | |
| | | | 296/180.1 |
| 2022/0315134 A1 | 10/2022 | Moradnia et al. | |
| 2022/0315135 A1* | 10/2022 | Moradnia ............ B62D 35/007 | |
| 2022/0402564 A1 | 12/2022 | Rose et al. | |
| 2023/0069045 A1 | 3/2023 | Rose et al. | |

FOREIGN PATENT DOCUMENTS

| | | |
|---|---|---|
| DE | 102016105994 A1 | 10/2017 |
| DE | 102018209474 A1 | 12/2019 |
| EP | 3676162 B1 | 10/2022 |
| GB | 1544478 A | 4/1979 |
| JP | 7127533 B2 | 8/2022 |
| WO | 2018083691 A1 | 5/2018 |

* cited by examiner

*Primary Examiner* — Jason S Daniels

(74) *Attorney, Agent, or Firm* — Plumsea Law Group, LLC

(57) ABSTRACT

A deployable aerodynamic element for a vehicle includes a frame forming at least a portion of a periphery of the aerodynamic element and elastic sheeting configured to extend between the frame and a body of the vehicle. The frame is movable with respect to the body of the vehicle such that the aerodynamic element is deployable between a stowed position in which the elastic sheeting of the aerodynamic element has a first surface area and a deployed position in which the elastic sheeting of the aerodynamic element has a second surface area that is greater than the first surface area.

20 Claims, 9 Drawing Sheets

DEPLOYABLE AERODYNAMIC ELEMENT FOR A VEHICLE

TECHNICAL FIELD

The present disclosure generally relates to an aerodynamic element for a vehicle and, more particularly, a deployable aerodynamic element formed by elastic sheeting.

BACKGROUND

The desirable configuration for an automotive aerodynamic element may differ depending on various conditions, such as vehicle operating conditions (e.g., vehicle speed, acceleration, yaw rate, etc.), geographic location, ambient temperature, precipitation, etc. Since most vehicles operate in a variety of conditions, it is desirable for aerodynamic elements to have variable configurations. For example, it may be desirable for an aerodynamic element to have greater surface area under certain conditions, such as at higher speeds.

The present disclosure is directed at implementing one or more of the desirable features and/or functions described above.

SUMMARY

An exemplary aerodynamic element for a vehicle may utilize an elastic sheeting for aerodynamic surfaces that expands and contracts with movement of a frame. For example, one or more portions of the elastic sheeting may be attached to the body of the vehicle and other portion(s) of the elastic sheeting may be attached to the movable frame. As the frame is moved away from the body of the vehicle, the sheeting may expand to provide the aerodynamic element with a larger surface area.

In one aspect, the present invention is directed to a deployable aerodynamic element for a vehicle including a frame forming at least a portion of a periphery of the aerodynamic element and elastic sheeting configured to extend between the frame and a body of the vehicle. The frame is movable with respect to the body of the vehicle such that the aerodynamic element is deployable between a stowed position in which the elastic sheeting of the aerodynamic element has a first surface area and a deployed position in which the elastic sheeting of the aerodynamic element has a second surface area that is greater than the first surface area.

In another aspect, the present invention is directed to an adaptive vehicle aerodynamics system including a deployable aerodynamic element, including: a frame forming at least a portion of a periphery of the aerodynamic element and elastic sheeting configured to extend between the frame and a body of the vehicle. The frame is movable with respect to the body of the vehicle such that the aerodynamic element is deployable between a stowed position in which the elastic sheeting of the aerodynamic element has a first surface area and a deployed position in which the elastic sheeting of the aerodynamic element has a second surface area that is greater than the first surface area. The system also includes a controller including a device processor and a non-transitory computer readable medium including instructions executable by the processor to control operation of the deployable aerodynamic element.

In another aspect, the present invention is directed to a vehicle having an adaptive aerodynamic element. The vehicle includes a vehicle body, and a deployable aerodynamic element mounted on the vehicle, the deployable aerodynamic element including: a frame forming at least a portion of a periphery of the aerodynamic element and elastic sheeting configured to extend between the frame and the vehicle body. The frame is movable with respect to the vehicle body such that the aerodynamic element is deployable between a stowed position in which the elastic sheeting of the aerodynamic element has a first surface area and a deployed position in which the elastic sheeting of the aerodynamic element has a second surface area that is greater than the first surface area.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The disclosed invention relates generally to a deployable aerodynamic element for a vehicle. As such, the invention can be used in connection with any type of vehicle. Thus, the terms "automobile" and "vehicle" as used throughout the specification and claims refer to any moving vehicle. For example, it will be understood that the term "vehicle," as used herein, refers to cars, trucks, vans, minivans, sport utility vehicles (SUV's), watercraft, aircraft, and other such vehicles. It will be further understood that, when referring to a "vehicle," the present disclosure also encompasses trailers that may be pulled by a powered vehicle. That is, the disclosed aerodynamic elements may be disposed on the body of a trailer.

As used herein, the term "fixedly attached" shall refer to two components joined in a manner such that the components may not be readily separated (for example, without destroying one or both components).

An exemplary aerodynamic element for a vehicle is discussed below. As illustrated in the accompanying figures, the aerodynamic element may utilize an elastic sheeting for aerodynamic surfaces that expands and contracts with movement of a frame. In some embodiments, such an aerodynamic element may be implemented as a roof spoiler. FIGS. 1-8 illustrate an exemplary roof spoiler type aerodynamic element including an elastic sheeting.

Figure 1:
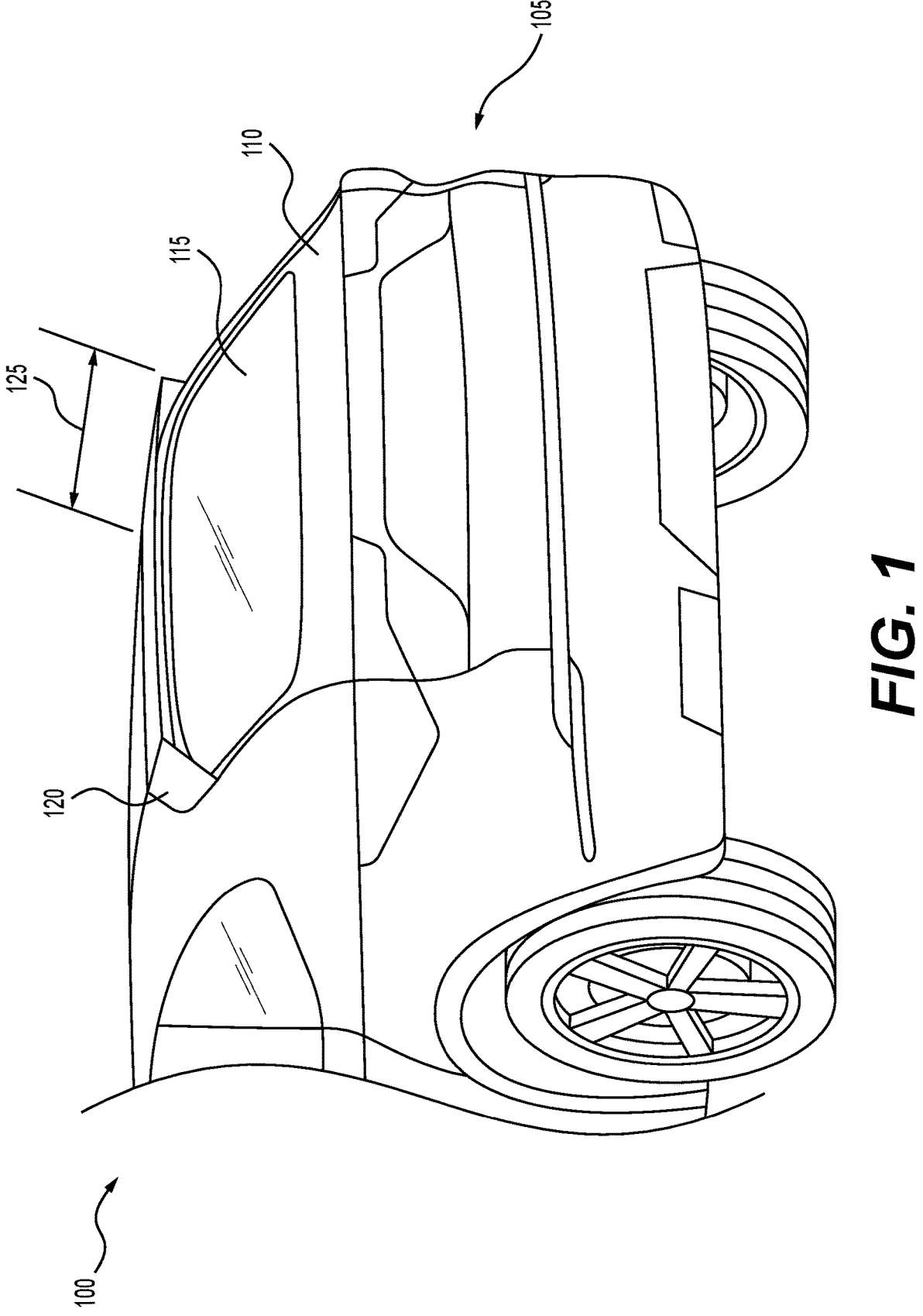
FIG. 1 is a schematic perspective view of a rear of a vehicle with an aerodynamic element in a stowed position according to an exemplary embodiment.

FIG. 1 is a schematic perspective view of a rear of a vehicle with an aerodynamic element in a stowed position according to an exemplary embodiment. As shown in FIG. 1, a vehicle 100 has a rear portion 105 including a rear hatch 110, which incorporates a rear window. As further shown in FIG. 1, vehicle 100 includes, at the top portion of rear hatch 110, an aerodynamic element 120. In the illustrated embodiment, aerodynamic element 120 is shown as a roof spoiler. Such roof spoilers, depending on their configuration, may be utilized to reduce drag, produce downforce, and/or to direct air down along the rear window to keep it clean.

It will be understood that, in other embodiments, the elastic aerodynamic element may be implemented in other portions of the vehicle. FIGS. 9 and 10 illustrate alternative locations for the disclosed elastic aerodynamic element and will be discussed in greater detail below. It will be further understood that portions of the following description of the embodiment shown in FIGS. 1-8 may also be applicable to the embodiments shown in FIGS. 9 and 10.

FIG. 1 shows aerodynamic element 120 in a stowed position. As shown in FIG. 1, aerodynamic element 120 has a stowed breadth 125.

The disclosed aerodynamic element 120 may include a frame forming at least a portion of a periphery of the aerodynamic element and elastic sheeting configured to extend between the frame of the aerodynamic element and the body of the vehicle. The frame may be movable with respect to the body of the vehicle such that the aerodynamic element is deployable between a stowed position, such as that shown in FIG. 1, in which the elastic sheeting of the aerodynamic element has a first surface area and a deployed position, such as that shown in FIG. 2, in which the elastic sheeting of the aerodynamic element has a second surface area that is greater than the first surface area.

Figure 2:
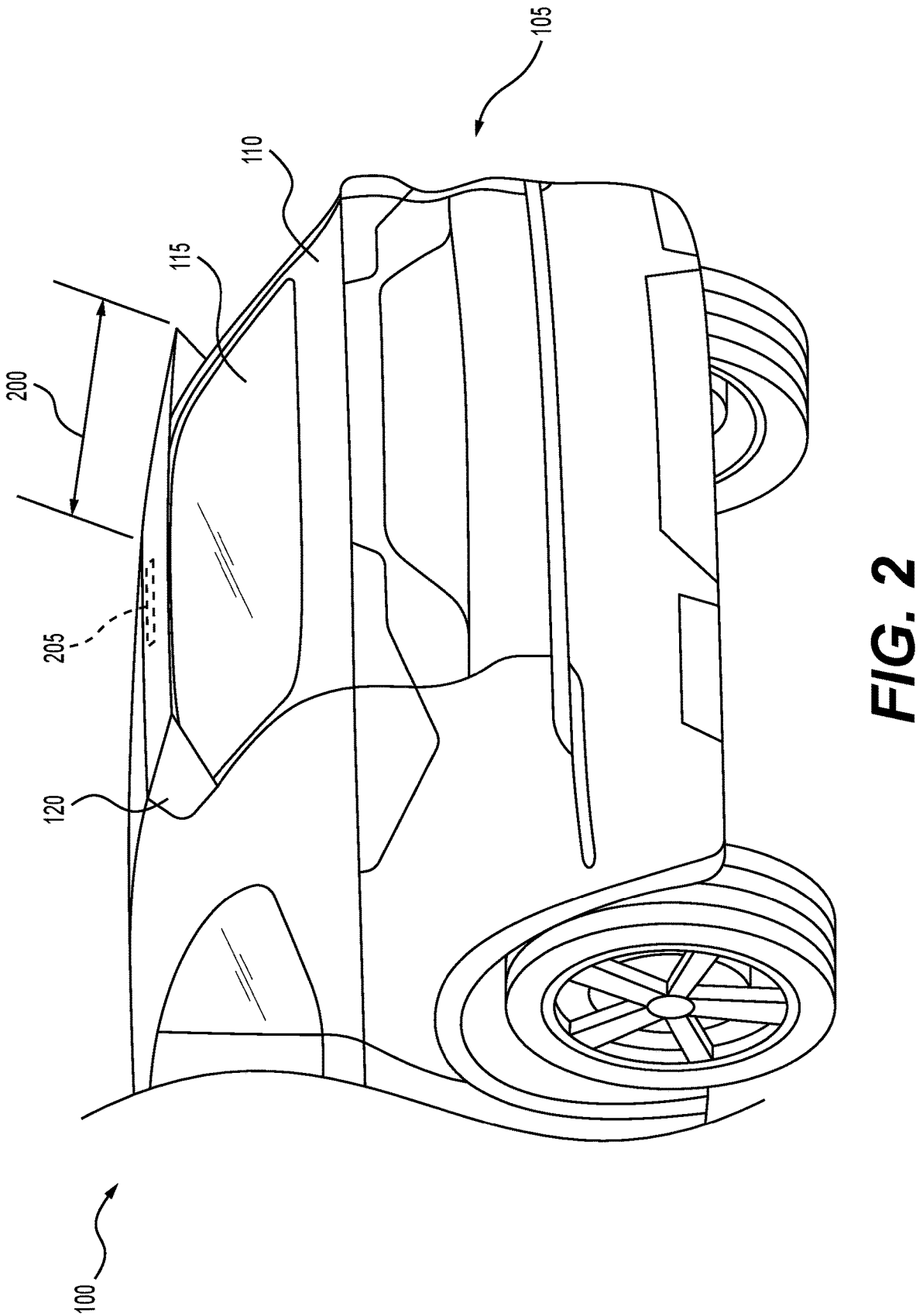
FIG. 2 shows the vehicle of FIG. 1 with the aerodynamic element in a deployed position.

FIG. 2 shows the vehicle of FIG. 1 with the aerodynamic element in a deployed position. In the deployed condition shown in FIG. 2, aerodynamic element 120 has a deployed breadth 200, which is greater than stowed breadth 125 shown in FIG. 1. As the frame is moved away from the body of vehicle 100, it stretches the elastic sheeting to provide aerodynamic element 120 with the greater deployed breadth 200, and thus, a larger surface area, which may increase the aerodynamic effect provided by aerodynamic element 120.

In some embodiments, the elastic sheeting may be at least partially transparent. In such embodiments, an exterior lighting element of the vehicle may be visible through the elastic sheeting. For example, as illustrated in FIG. 2, a third brake light 205 may be visible through aerodynamic element 120. This may be beneficial since, in the deployed position, aerodynamic element 120 may otherwise obscure third brake light 205.

In some embodiments, the frame of the aerodynamic element may be pivotally attached to the vehicle body. For example, the frame may be rotated about a point of rotation in order to elongate a portion of the elastic sheeting at an end opposite the point of rotation.

Figure 3:
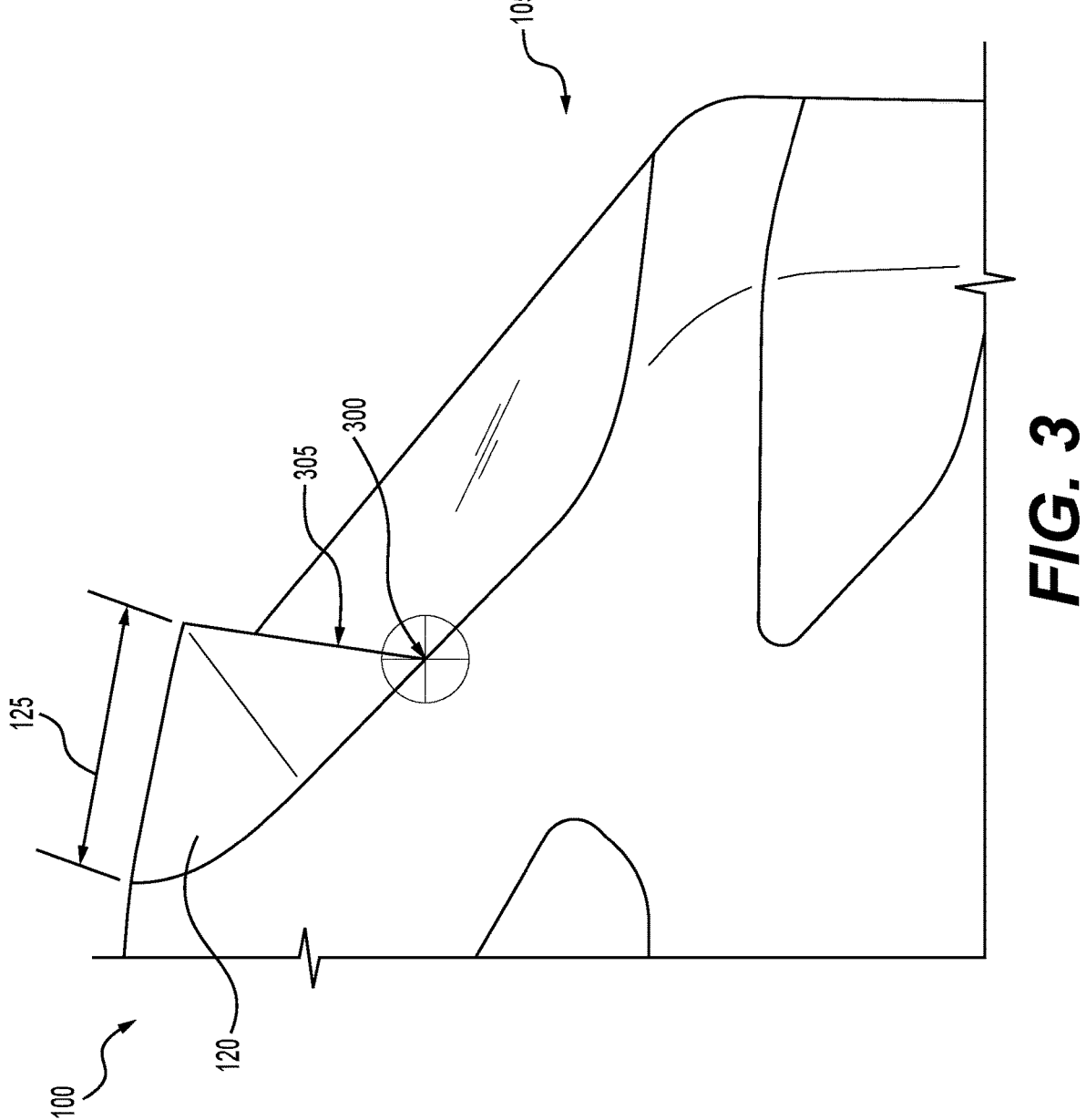
FIG. 3 is a schematic partial side view of a vehicle with an aerodynamic element in a stowed position according to an exemplary embodiment.

FIG. 3 is a schematic partial side view of a vehicle with an aerodynamic element in a stowed position according to an exemplary embodiment. As shown in FIG. 3, aerodynamic element 120 may have a point of rotation 300 about which a peripheral frame 305 may be rotated.

Figure 4:
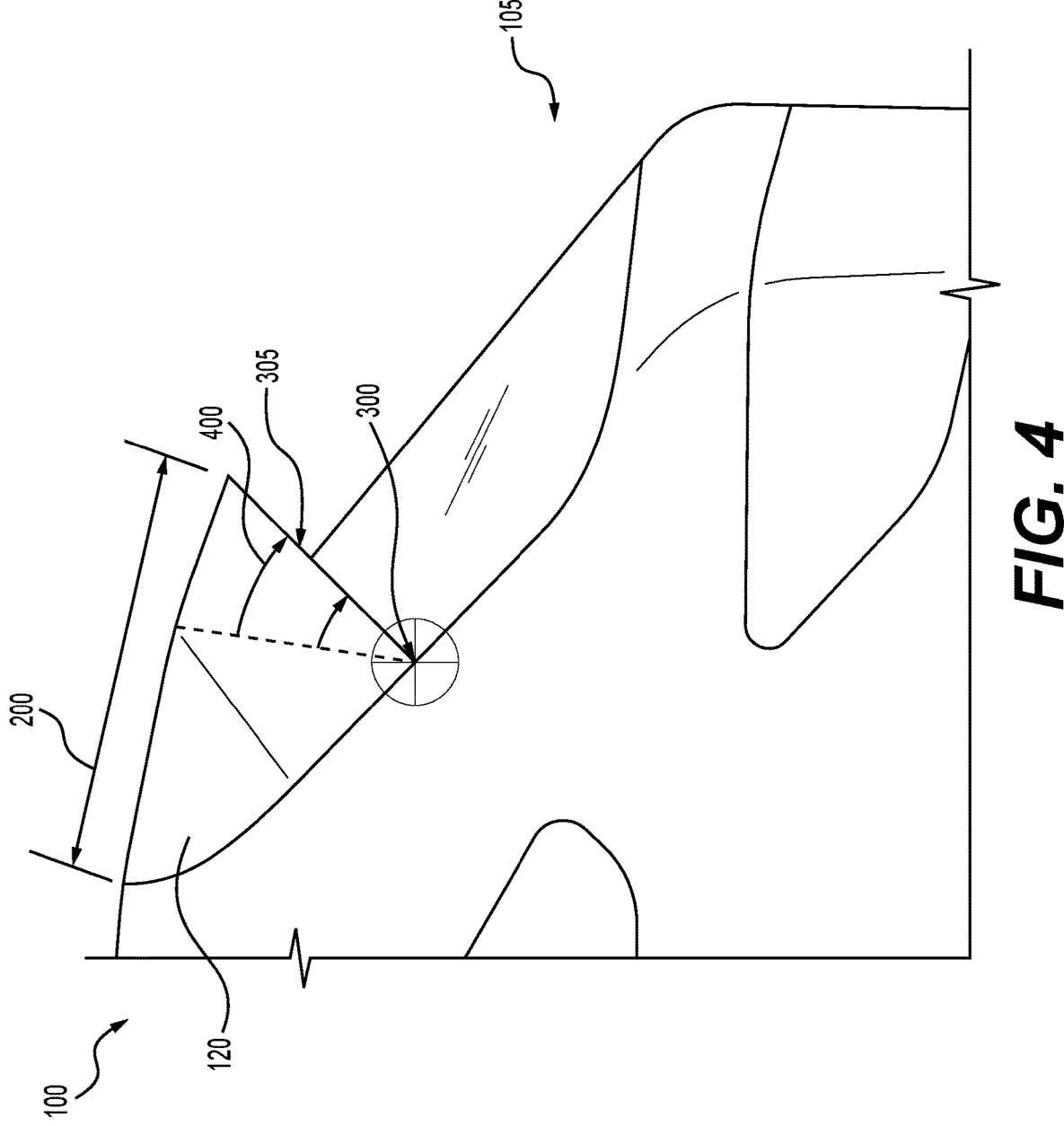
FIG. 4 shows the vehicle of FIG. 3 with the aerodynamic element in a deployed position.

FIG. 4 shows the vehicle of FIG. 3 with the aerodynamic element in a deployed position. Arrows 400 illustrate the motion of deployment of aerodynamic element 120, which occurs by virtue of the rotation of peripheral frame 305 about point of rotation 300, resulting in deployed breadth 200.

It will be understood that the elastic sheeting may be formed of any suitable elastic material for the exterior of a vehicle. That is, the elastic sheeting may be formed of a material that not only stretches upon movement of the frame away from the body of the vehicle, but also returns to an unstretched condition when the frame returns to the stowed position. For example, the elastic sheeting may be formed of an elastic fabric, a rubberized sheet, a non-Newtonian fluid, and/or any other elastic/stretchable material.

In some embodiments, the elastic sheeting may be formed in several pieces. In some embodiments, the elastic sheeting may be formed in several pieces having different elasticities from one another. This may enable a greater amount of stretch in certain portions of the aerodynamic element.

Figures 5, 6:
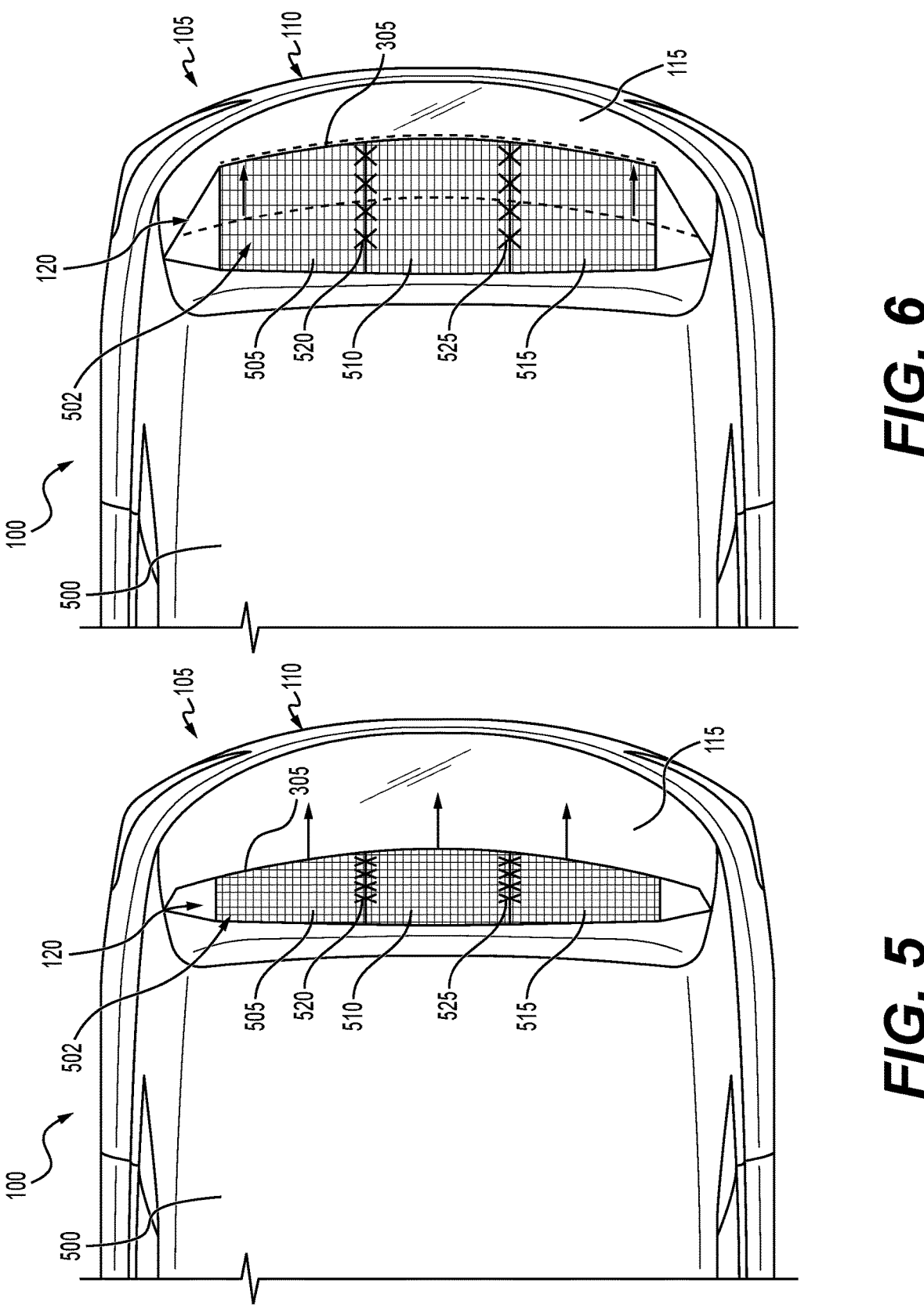
FIG. 5 is a schematic partial top view of a vehicle with an aerodynamic element in a stowed position according to an exemplary embodiment.
FIG. 6 shows the vehicle of FIG. 5 with the aerodynamic element in a deployed position.

FIG. 5 is a schematic partial top view of a vehicle with an aerodynamic element in a stowed position according to an exemplary embodiment. As shown in FIG. 5, a vehicle roof 500 includes aerodynamic element 120 at the rear portion, in this case at a top portion of rear hatch 110. Aerodynamic element 120 is formed of peripheral frame 305 and an elastic sheeting 502 extending between the vehicle body and peripheral frame 305.

Elastic sheeting 502 may be formed of multiple sections, in this case three sections that are adjoined to one another. For example, as shown in FIG. 5, elastic sheeting 502 is formed of a first section 505, a second section 510, and a third section 515 that may be fixedly attached to one another. First section 505 and section 510 may be adjoined at a first joint 520. Similarly, second section 510 may be adjoined to third section 515 at a second joint 525. It will be understood that first joint 520 and second joint 525 may be formed using any suitable means of attaching elastic materials to one another. For example, in some cases, the joints may be formed using stitching, heat fusion, adhesive, and/or any other suitable type of attachment.

FIG. 6 shows the vehicle of FIG. 5 with the aerodynamic element in a deployed position. As shown in FIG. 6, peripheral frame 305 has been moved from one dashed line to another and, as a result, elastic sheeting 502 has been stretched, as indicated by the distortion of the grid fill, which is merely symbolic in nature. It will be noted that elastic sheeting 502 may be stretched by different amounts in different areas. For example, second section 510 may be more elastic (i.e., more stretchy or stretchier) than first section 505 and third section 515. This may enable the center section of aerodynamic element 120 to elongate by a greater amount than the side sections. Further, even within the same section of elastic sheeting material, different portions of the section may elongate by different amounts with the movement of the frame.

Figures 7, 8:
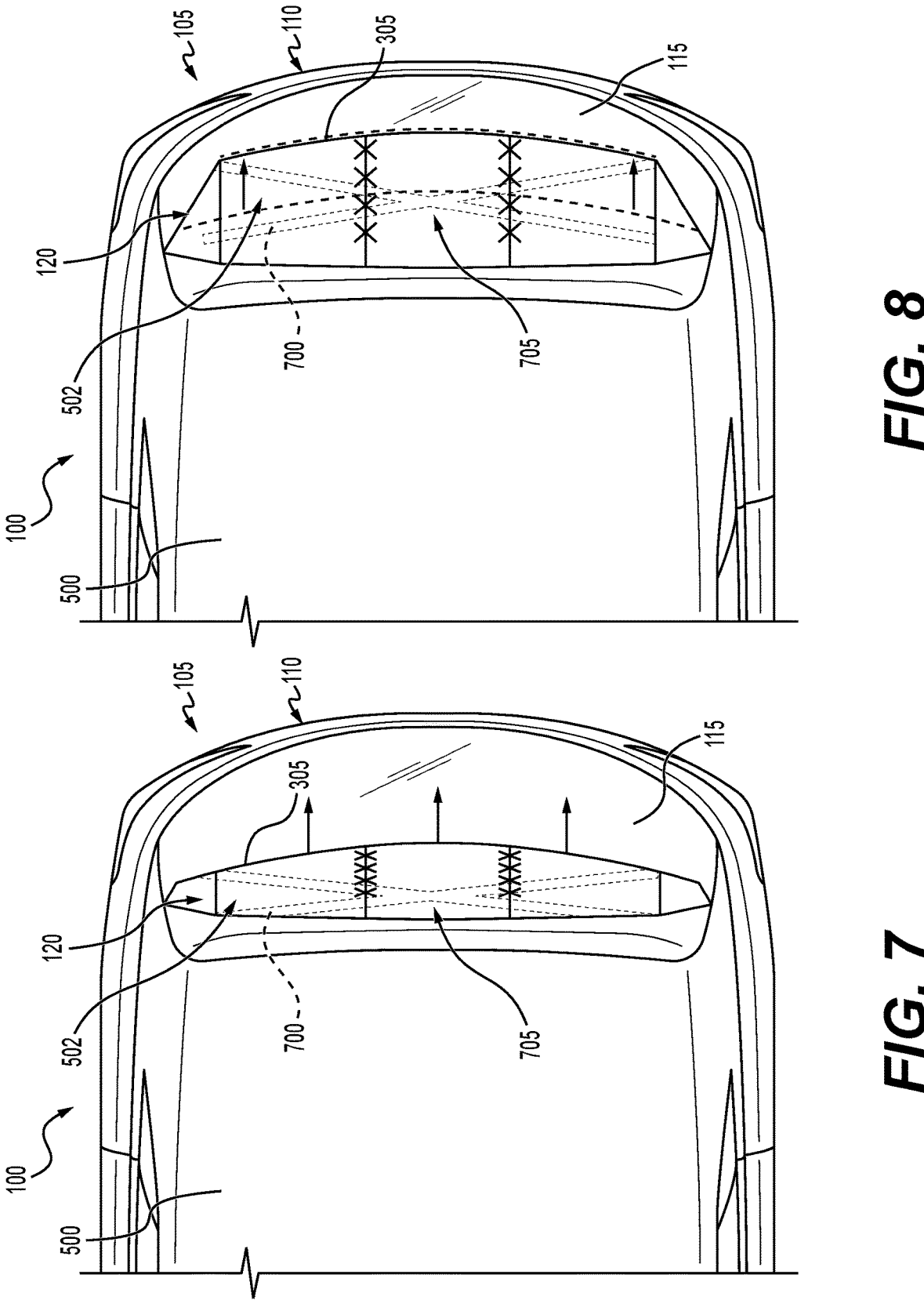
FIG. 7 is a schematic partial top view of a vehicle with an aerodynamic element in a stowed position with a frame of the aerodynamic element illustrated.
FIG. 8 shows the vehicle of FIG. 7 with the aerodynamic element in a deployed position.
Figures 9, 10:
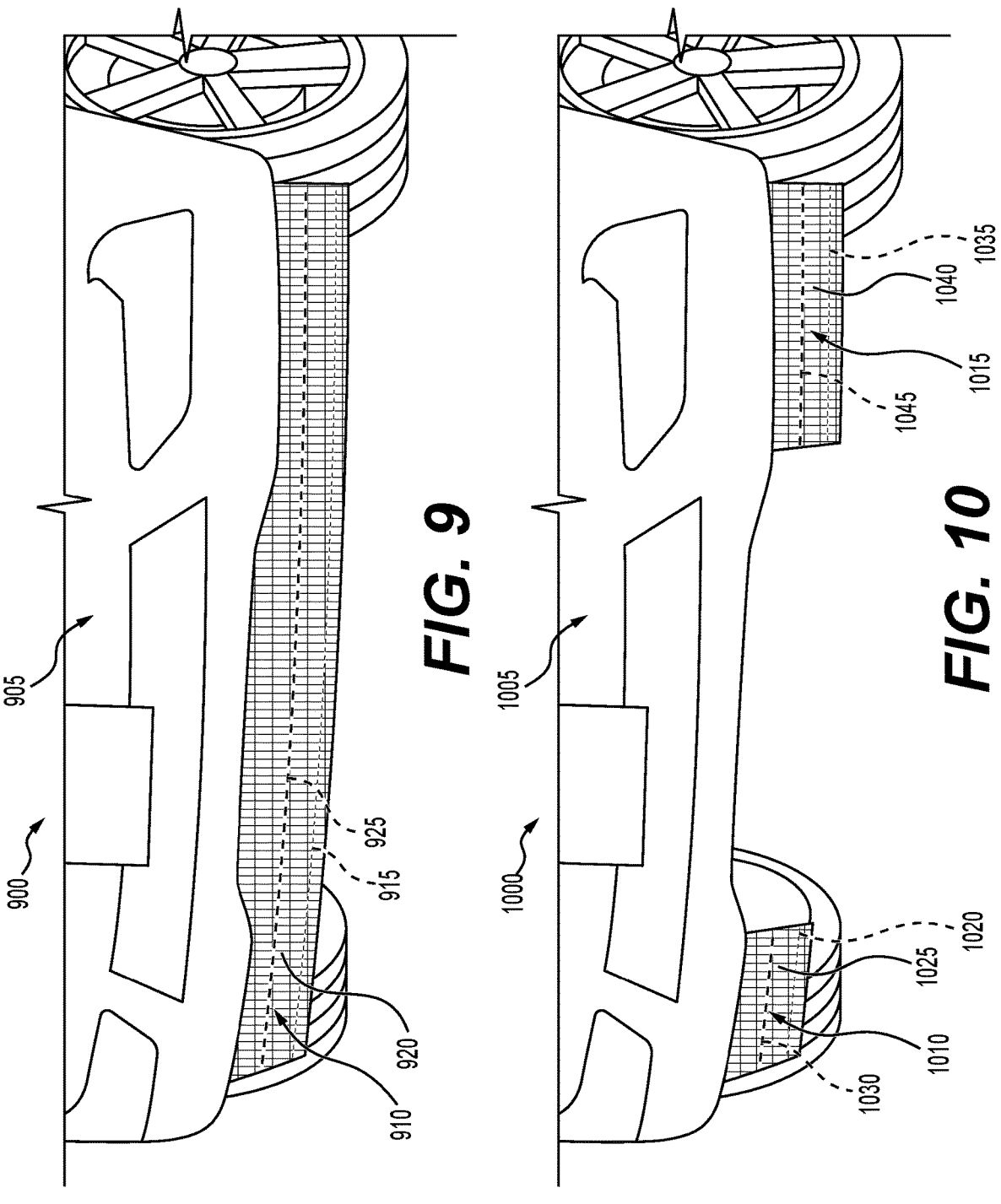
FIG. 9 is a schematic partial view of a front end of a vehicle having an aerodynamic element in the form of a front air dam according to an exemplary embodiment.
FIG. 10 is a schematic partial view of a front end of a vehicle having aerodynamic elements in the form of wheel strakes according to an exemplary embodiment.

FIG. 7 is a schematic partial top view of a vehicle with an aerodynamic element in a stowed position with a frame of the aerodynamic element illustrated. As shown in FIG. 7, aerodynamic element 120 may include not only peripheral frame 305, but also supportive frame 700. As shown in FIG. 7, supportive frame 700 includes a scissor joint 705. It will also be understood that supportive frame 700 may be arranged in a plane or, in some embodiments, may be curved, e.g., like an umbrella. Also like an umbrella, supportive frame may be tucked underneath the sheeting, which in this case is elastic.

FIG. 8 shows the vehicle of FIG. 7 with the aerodynamic element in a deployed position. As shown in FIG. 8, the "X" of supportive frame 700 is opened, by virtue of pivoting at scissor joint 705.

As discussed above, aerodynamic elements formed of a frame and elastic sheeting may be used in other portions of a vehicle besides a roof spoiler. For example, such aerodynamic elements may be implemented as a front air dam, wheel strakes, sunroof deflector, etc.

FIG. 9 is a schematic partial view of a front end of a vehicle having an aerodynamic element in the form of a front air dam according to an exemplary embodiment. As shown in FIG. 9, a vehicle 900 includes a front end 905. Front end 905 of vehicle 900 includes a front air dam 910 configured to deflect air passing under the vehicle and reduce drag. As also shown in FIG. 9, front air dam 910 includes a frame 915 and elastic sheeting 920 extending between the body of vehicle 900 and frame 915. FIG. 9 illustrates front air dam 910 in a deployed position. In FIG. 9, a dashed line 925 illustrates a stowed position of frame 915, indicating that front air dam 910 extends down much less in the stowed position.

FIG. 10 is a schematic partial view of a front end of a vehicle having aerodynamic elements in the form of wheel strakes according to an exemplary embodiment. As shown in FIG. 10, a vehicle 1000 includes a front end 1005. Front end 1005 of vehicle 1000 includes a first wheel strake 1010 extending down from the body of vehicle 1000 in front of the right front wheel of vehicle 1000, the first wheel strake 1010 being configured to deflect air around the wheel in order to reduce drag and increase stability. As also shown in FIG. 10, vehicle 1000 includes a second wheel strake 1015 in front of the left front wheel of vehicle 1000 and configured similarly.

First wheel strake 1010 includes a first frame 1020 and elastic sheeting 1025 extending between the body of vehicle 1000 and first frame 1020. FIG. 10 illustrates first wheel strake 1010 in a deployed position. In FIG. 10, a first dashed line 1030 illustrates a stowed position of frame 1020, indicating that first wheel strake 1010 extends down much less in the stowed position.

Second wheel strake 1015 includes a second frame 1035 and elastic sheeting 1040 extending between the body of vehicle 1000 and second frame 1035. FIG. 10 illustrates second wheel strake 1015 in a deployed position. In FIG. 10, a second dashed line 1045 illustrates a stowed position of frame 1035, indicating that second wheel strake 1015 extends down much less in the stowed position.

The aerodynamic elements discussed herein may be implemented as part of a system controllable automatically and/or with user input. Accordingly, the system may include not only the aerodynamic element, but also a controller configured to receive conditions data and an actuator for controlling deployment of the aerodynamic device.

Figure 11:
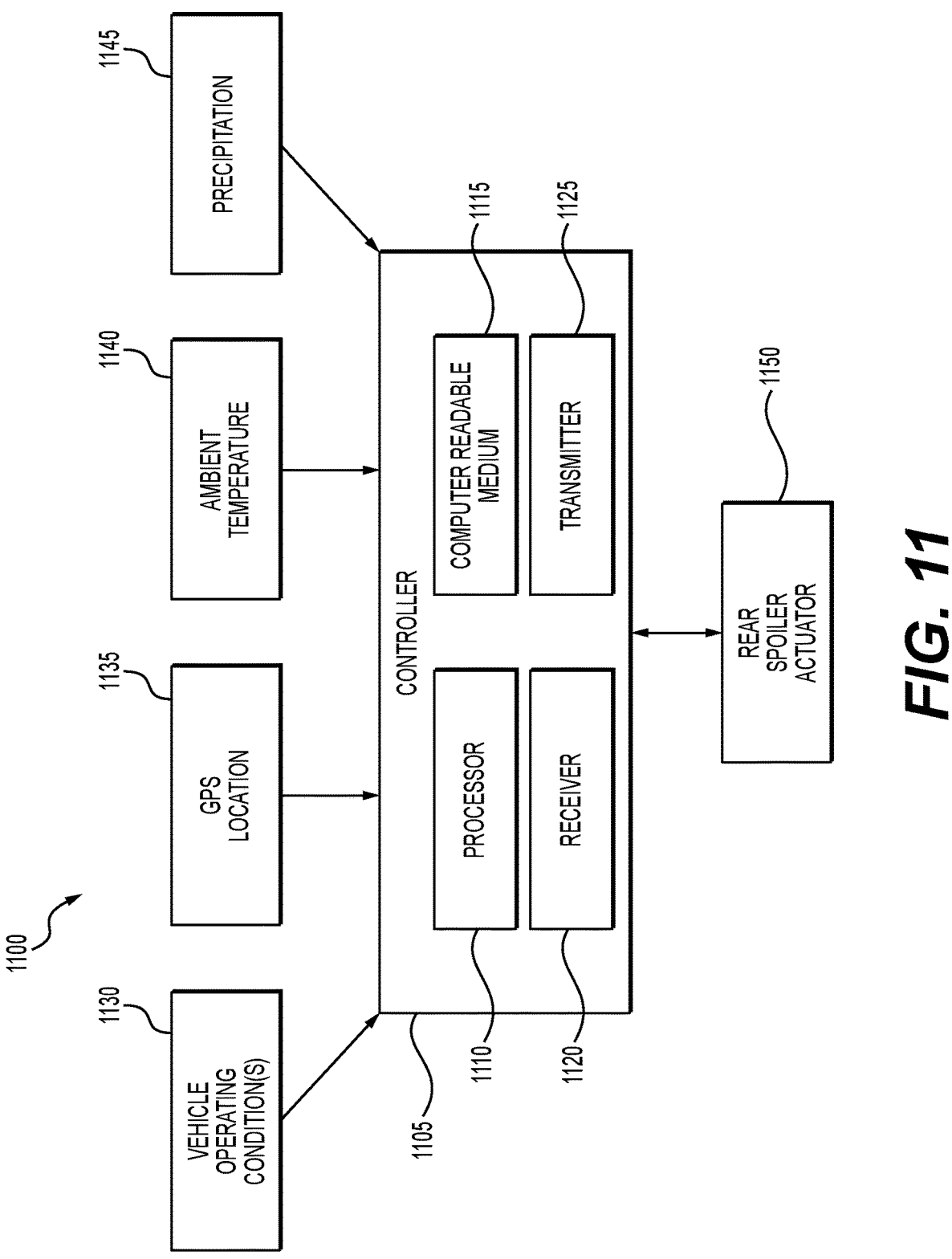
FIG. 11 is a schematic block diagram illustrating components of an adaptive aerodynamic system.

FIG. 11 is a schematic block diagram illustrating components of an adaptive aerodynamic system. As shown in FIG. 11, an adaptive vehicle aerodynamics system 1100 includes a controller 1105. Controller 1105 may include various computing and communications hardware, such as servers, circuitry, displays, etc. Further, controller 1105 includes a device processor 1110 and a non-transitory computer readable medium 1115 including instructions executable by device processor 1110 to perform the processes discussed herein, such as controlling operation of the deployable aerodynamic element.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 1105 may include networking hardware configured to interface with other nodes of a network, such as a LAN, WLAN, or other networks. In Further, controller 1105 may be configured to receive data from a plurality of sources and communicate information to one or more external destinations. Accordingly, controller 1105 may include a receiver 1120 and a transmitter 1125. (It will be appreciated that, in some embodiments, the receiver and transmitter may be combined in a transceiver.)

Any suitable communication platforms and/or protocols may be utilized for communication between controller 1105 and other components of the system. Since the various sources of information may each have their own platform and/or protocol, the system may be configured to interface with each platform and/or protocol to receive the data.

In some embodiments, computer readable medium 1115 of controller 1105 includes instructions, executable by processor 1110, to receive data from one or more sources and control the deployable aerodynamic element based on the conditions indicated by the received data. For example, in some embodiments, computer readable medium 1115 includes instructions for receiving data regarding vehicle operating conditions (1130). Such vehicle operating conditions may include, for example, vehicle speed, acceleration, yaw rate, etc. In addition, another vehicle condition that may be detected is a manual selection to deploy or stow the aerodynamic element.

Alternatively, or additionally, controller 1105 may be configured to receive data regarding the Global Positioning System (GPS) location (1135) of the vehicle. Controller 1105 may also be configured to receive data regarding ambient temperature (1140) and/or precipitation (1145). It will be understood that controller 1105 may be configured (via instructions in computer readable medium 1115) to receive data regarding various other vehicular and/or environmental conditions.

System 1100 may also include a deployable aerodynamic element, such as a rear spoiler. The aerodynamic element may include a frame forming at least a portion of a periphery of the aerodynamic element, and elastic sheeting configured to extend between the frame and a body of the vehicle, wherein the frame is movable with respect to the body of the vehicle such that the aerodynamic element is deployable between a stowed position in which the elastic sheeting of the aerodynamic element has a first surface area and a deployed position in which the elastic sheeting of the aerodynamic element has a second surface area that is greater than the first surface area.

As illustrated by the double-headed arrow in FIG. 11, controller 1105 may be configured to send instructions to, and receive data from, a rear spoiler actuator (1150). For example, not only may controller 1105 send instructions to deploy and stow the spoiler, but the position of the spoiler may be detected by the system and received by controller 1105. Further, the system may determine whether a deploy/stow instruction needs to be sent based on the current position of the spoiler detected by the system.

In some embodiments, computer readable medium 1115 may include instructions for automated control of the deployable aerodynamic element. For example, the system may be configured to automatically deploy/stow the spoiler based on the data received by the controller.

Figure 12:
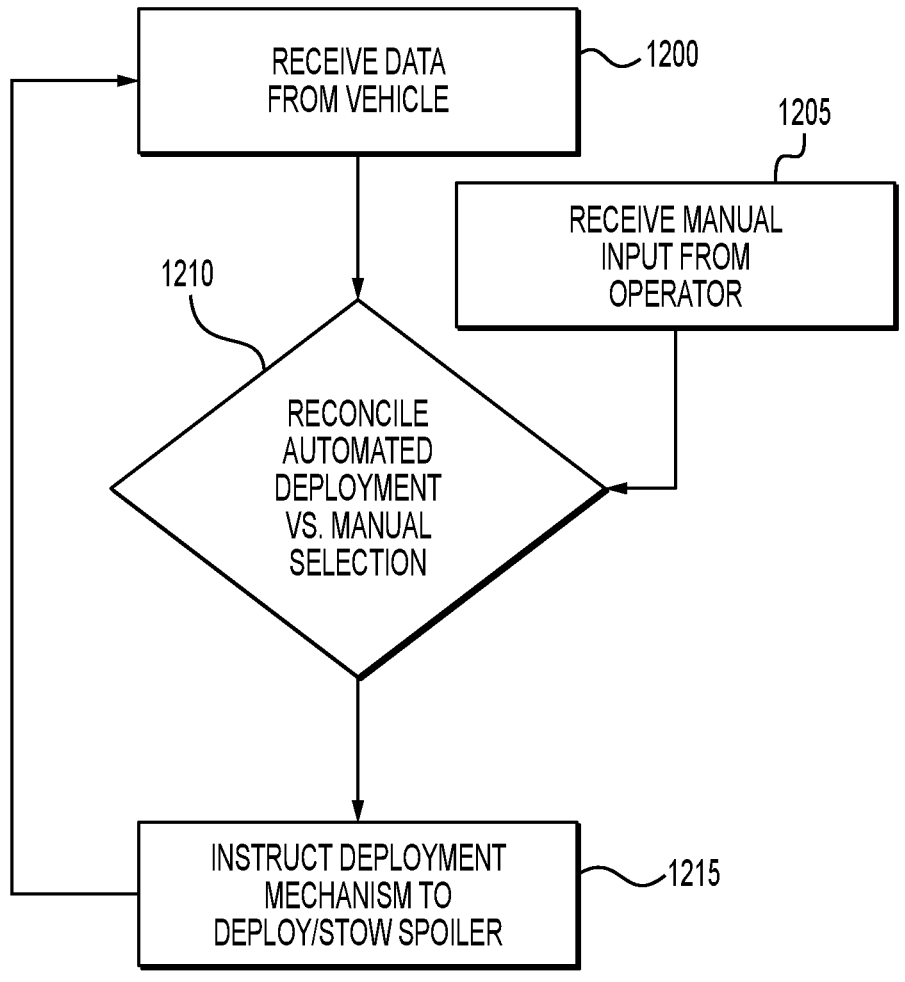
FIG. 12 is a flow chart illustrating steps of a method of operating the system illustrated in FIG. 11.

FIG. 12 is a flow chart illustrating steps of a method of operating the system illustrated in FIG. 11. As shown in FIG. 12, at step 1200, the controller may receive data from the vehicle. This data may include not only vehicle operations data (e.g., vehicle speed, acceleration, etc.), but also environmental data (e.g., ambient temperature, precipitation, altitude, etc.).

In addition, at step 1205, the controller may receive manual input from an operator of the vehicle. At step 1210, the system may determine whether or not the aerodynamic element should be deployed and reconcile the automated deployment versus the manual selection of the operator. For example, in some embodiments, the computer readable medium may include instructions for receiving input from an operator and overriding automated control of deployment of the aerodynamic element based on the input from the operator.

Once a determination has been made whether to deploy or stow the aerodynamic element at step 1210, the system may, at step 1215, instruct the deployment mechanism to deploy or stow the spoiler accordingly.

The aerodynamic element may be either stowed or deployed as the default. For example, in some embodiments, the computer readable medium includes instructions for maintaining the aerodynamic element in the stowed position as a default position. Alternatively, in other embodiments, the computer readable medium includes instructions for maintaining the aerodynamic element in the deployed position as a default position.

As shown in FIG. 12, the method logic may loop back to the beginning, with controller constantly evaluating vehicle operating conditions, environmental conditions, and operator input to determine whether to deploy or stow the aerodynamic element.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

I claim:

1. A deployable aerodynamic element for a vehicle, comprising:

a frame forming at least a portion of a periphery of the aerodynamic element; and elastic sheeting configured to extend between the frame and a body of the vehicle;

wherein the frame is movable with respect to the body of the vehicle such that the aerodynamic element is deployable between a stowed position in which the elastic sheeting of the aerodynamic element has a first surface area and a deployed position in which the elastic sheeting of the aerodynamic element has a second surface area that is greater than the first surface area.

2. The aerodynamic element of claim 1, wherein the aerodynamic element is configured for use as one of the following vehicle components:

a roof spoiler;

a front air dam;

an underbody cover;

a sunroof wind deflector; and a wheel strake.

3. The aerodynamic element of claim 1, wherein the elastic sheeting is formed of at least one of the following:

an elastic fabric;

a rubberized sheet; and a non-Newtonian fluid.

4. The aerodynamic element of claim 1, wherein the elastic sheeting is formed in several pieces having different elasticities from one another.

5. The aerodynamic element of claim 1, wherein the elastic sheeting is at least partially transparent.

6. An adaptive vehicle aerodynamics system, comprising:

a deployable aerodynamic element, including:

a frame forming at least a portion of a periphery of the aerodynamic element; and elastic sheeting configured to extend between the frame and a body of the vehicle;

wherein the frame is movable with respect to the body of the vehicle such that the aerodynamic element is deployable between a stowed position in which the elastic sheeting of the aerodynamic element has a first surface area and a deployed position in which the elastic sheeting of the aerodynamic element has a second surface area that is greater than the first surface area; and a controller including a device processor and a non-transitory computer readable medium including instructions executable by the processor to control operation of the deployable aerodynamic element.

7. The system of claim 6, wherein the computer readable medium includes instructions for automated control of the deployable aerodynamic element.

8. The system of claim 7, wherein the computer readable medium includes instructions for maintaining the aerodynamic element in the stowed position as a default position.

9. The system of claim 7, wherein the computer readable medium includes instructions for maintaining the aerodynamic element in the deployed position as a default position.

10. The system of claim 7, wherein the computer readable medium includes instructions for receiving input from an operator and overriding automated control of deployment of the aerodynamic element based on the input from the operator.

11. The system of claim 6, wherein the aerodynamic element is configured for use as one of the following vehicle components:

a roof spoiler;

a front air dam;

an underbody cover;

a sunroof wind deflector; and a wheel strake.

12. The system of claim 6, wherein the elastic sheeting is formed of at least one of the following:

an elastic fabric;

a rubberized sheet; and a non-Newtonian fluid.

13. The system of claim 6, wherein the elastic sheeting is formed in several pieces that are adjoined to one another.

14. The system of claim 13, wherein the elastic sheeting is formed in several pieces having different elasticities from one another.

15. The system of claim 6, wherein the elastic sheeting is at least partially transparent.

16. A vehicle having an adaptive aerodynamic element, comprising:

a vehicle body; and a deployable aerodynamic element mounted on the vehicle, the deployable aerodynamic element including:

a frame forming at least a portion of a periphery of the aerodynamic element; and elastic sheeting configured to extend between the frame and the vehicle body;

wherein the frame is movable with respect to the vehicle body such that the aerodynamic element is deployable between a stowed position in which the elastic sheeting of the aerodynamic element has a first surface area and a deployed position in which the elastic sheeting of the aerodynamic element has a second surface area that is greater than the first surface area.

17. The vehicle of claim 16, wherein the aerodynamic element is configured as one of the following components of the vehicle:

a roof spoiler;

a front air dam;

an underbody cover;

a sunroof wind deflector; and a wheel strake.

18. The vehicle of claim 16, wherein the elastic sheeting is formed in several pieces having different elasticities from one another.

19. The vehicle of claim 16, wherein the frame is pivotally attached to the vehicle body.

20. The vehicle of claim 16, wherein the elastic sheeting is at least partially transparent; and wherein an exterior lighting element of the vehicle is visible through the elastic sheeting.

* * * * *